March 31, 1925.

A. L. RUTHVEN 1,531,573

SIMPLEX TRAIN CONTROL

Filed April 5, 1922

Inventor:
A. L. RUTHVEN,
By Monroe E. Miller
Attorney

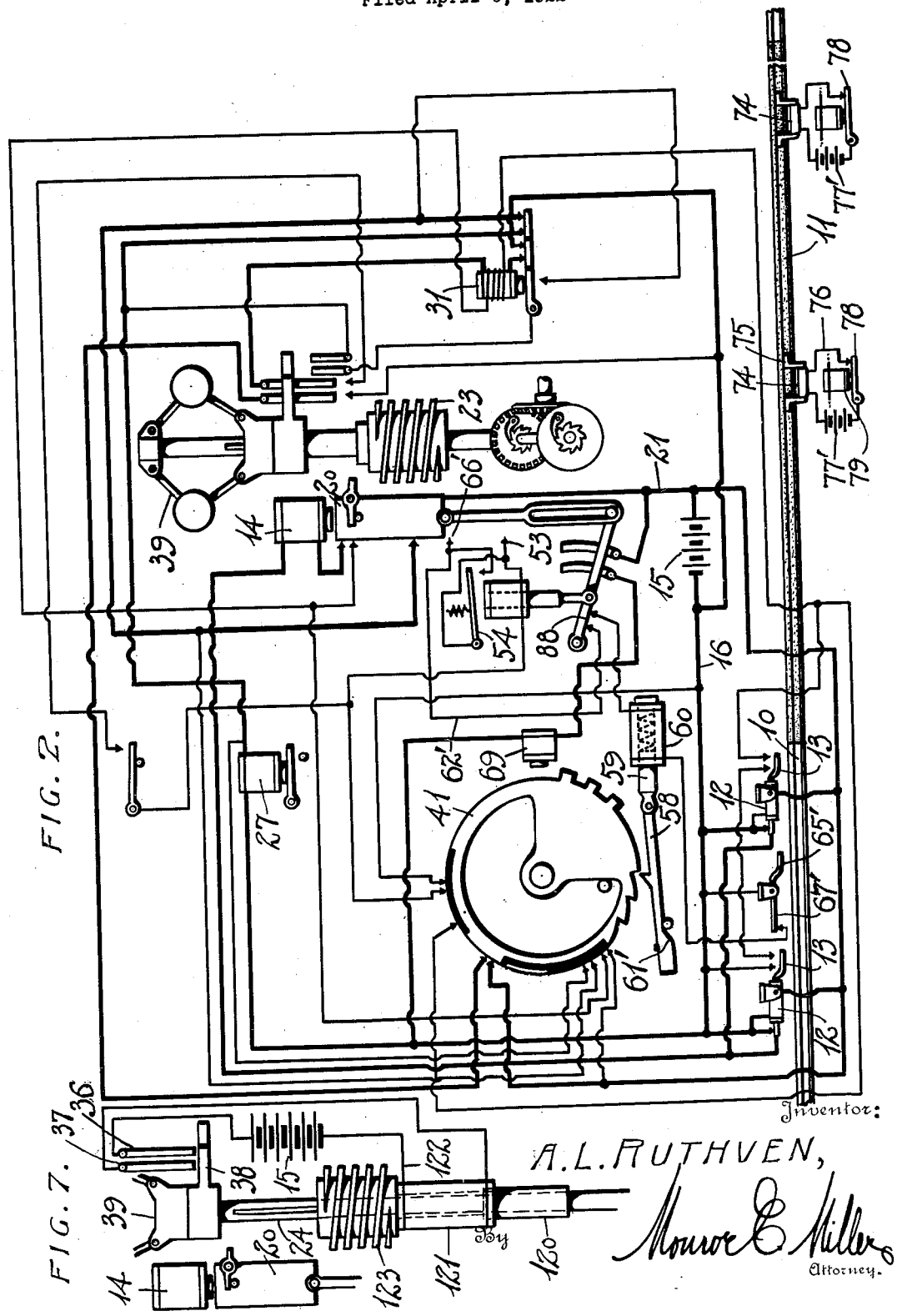

March 31, 1925.
A. L. RUTHVEN
1,531,573
SIMPLEX TRAIN CONTROL
Filed April 5, 1922   3 Sheets-Sheet 3
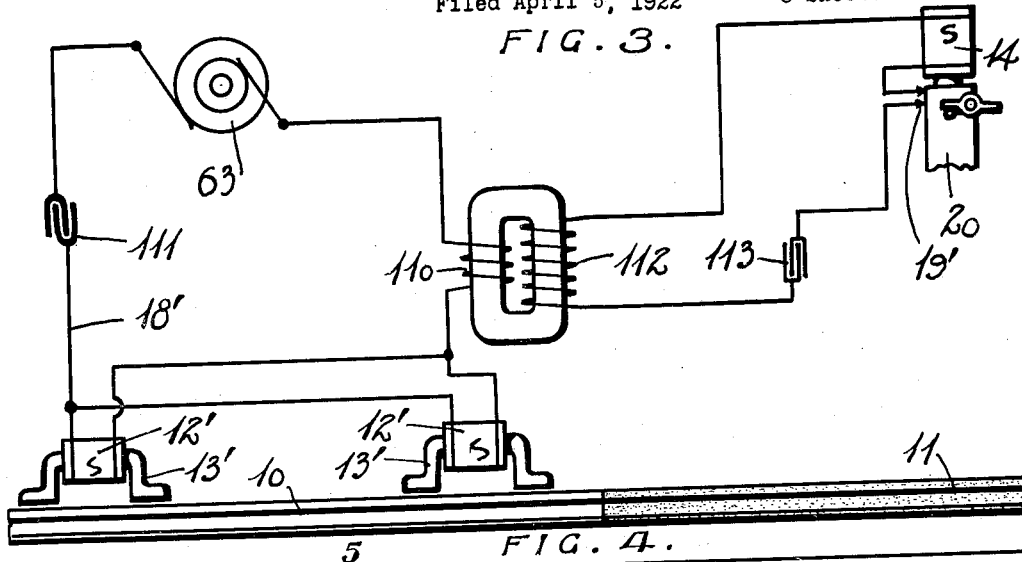
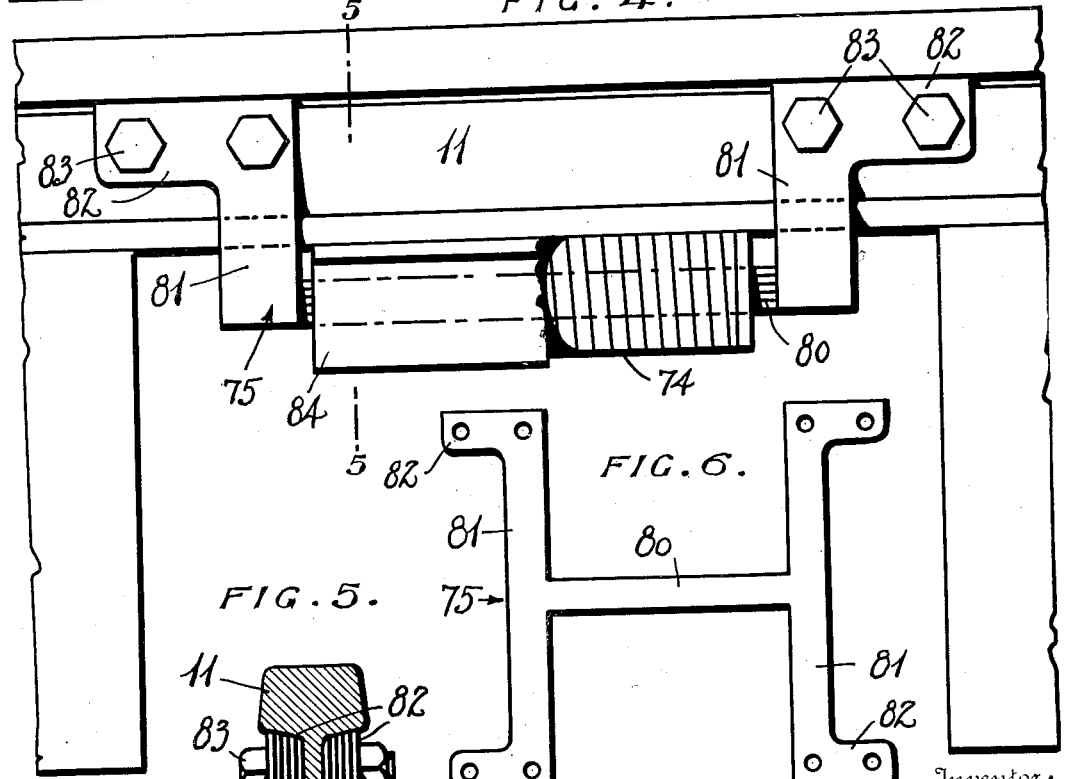
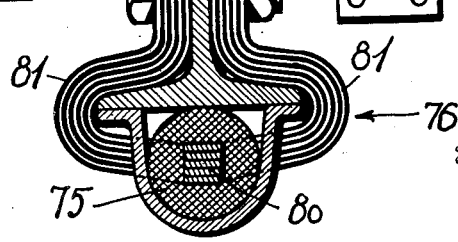
A. L. RUTHVEN,
Inventor
By Monroe B. Miller
Attorney.

Patented Mar. 31, 1925.

1,531,573

UNITED STATES PATENT OFFICE.

ALFRED L. RUTHVEN, OF ROCHESTER, NEW YORK.

SIMPLEX TRAIN CONTROL.

Application filed April 5, 1922. Serial No. 549,705.

*To all whom it may concern:*

Be it known that I, ALFRED L. RUTHVEN, a citizen of the United States, residing at Rochester, in the county of Monroe and State of New York, have invented certain new and useful Improvements in Simplex Train Controls, of which the following is a specification, reference being had therein to the accompanying drawing.

The present invention relates to train controlling apparatus, and aims to provide a novel and improved apparatus, which is also simple and composed of as few devices as possible, for obtaining the different desired controlling conditions in the vehicle equipment for the required or desired control of the vehicle by track conditions.

Another object is to provide such an apparatus employing a simple and effective means for obtaining, in a reliable, positive and assured manner, a danger or vehicle stopping condition whenever the vehicle passes a controlling station of the track, and additional means for putting the vehicle control equipment in caution or clear condition should the necessary signals or impulses be received from the track, the absence of same or failure of the apparatus resulting in the vehicle being stopped.

A further object, in this connection, is the utilization of one of the traffic rails to maintain the vehicle in running condition or control, and a non-magnetic section in the rail at the controlling station of the track, to assure of a danger or vehicle stopping condition being produced in the vehicle equipment, to bring the vehicle to a stop unless caution or clear conditions are produced while passing the controlling station.

A further object is the provision of a vehicle equipment using magnetic flux entering the ordinary steel or magnetic traffic rail to keep the vehicle in running condition, and to place the vehicle equipment in a danger or vehicle stopping condition when the magnetic flux enters the non-magnetic section of the rail, in order to assure of a positive and unfailing danger indication or condition in the vehicle equipment each time the vehicle passes a controlling station of the track.

Another object is to provide reliable and effective means for obtaining caution or clear conditions in the vehicle equipment, when proper or desired, when passing the controlling station of the track, and without the possibility of accidental false caution or clear signals or conditions, in order that the danger or vehicle stopping condition will only be avoided by the required caution or clear producing conditions.

A still further object is to combine the cores of electrical coils or windings with the non-magnetic section of the rail, for the cooperation of a magnetic flux affected member or device on the vehicle, in order to produce the caution or clear conditions in the vehicle equipment when and only when proper by the control of the circuits of said coils or windings, the arrangement being such that such coils or windings are inactive or dead in danger conditions on the track, so that the vehicle will be stopped by the failure to receive the caution or clear indications or signals from the track.

Another object of the invention is the provision of such an apparatus whereby the positive danger condition or indication and the desired caution or clear condition or indication are transmitted to the vehicle equipment from the track equipment without any contact devices between the vehicle and track whatever, either trips, ramps, or the like, and without the presence of any objects on the track between or at the outside of the rails, other than the coils or windings assembled with the non-magnetic section of the rail.

Another object is the provision of a vehicle equipment which will maintain itself in caution condition and under limited speed control through the block until the next controlling station of the track is reached, and a further object, in this connection, is to enable the vehicle to proceed under caution condition or limited speed control when the vehicle has been brought to a stop after receiving a danger indication.

The apparatus is also so arranged that in the event of the failure of any of the devices to function properly, a danger condition will be produced resulting in the stopping of the vehicle, thereby assuring of the fact that the vehicle can not proceed unless under proper control with the apparatus in proper operative condition, and another object is to provide such an apparatus wherein the possibility of a false or accidental clear indication or condition is reduced to the smallest possible minimum or practically eliminated, considering the maximum possible failures with all types of cooperative control mediums between the track and vehicle. In other words, the present apparatus practically eliminates each and every objection raised against almost all types of apparatus for transmitting the track conditions to the vehicle, there being no obstructions on the track or road bed, no contact devices between the track and vehicle, no devices suspended from the vehicle in such a way that they could be knocked off or damaged, no devices which are apt to get out of order (which if it happened would produce danger conditions), no devices to be impaired by adverse weather or climatic conditions, and no devices which when removed from the track or cooperating part of the vehicle equipment would leave the vehicle equipment in clear or running condition.

A further object of the invention is the provision of a device which retards the coming into action of the vehicle stopping means until a predetermined distance of the track has been travelled, past the controlling station, in order to give the caution and clearing devices an opportunity to act, under caution or clear conditions, to thereby avoid the retarding or stopping of the vehicle unless the danger condition is to control and the vehicle has moved a distance sufficient for the action of the caution and clear mediums.

It is also an object of the invention to improve the apparatus generally in the combination and arrangement and in the details of construction of the component parts and devices, to enhance the operation of the apparatus for obtaining maximum efficiency, reliability and safety, with a minimum possibility of failures.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Figure 1 is a diagrammatical view of one form of the apparatus.

Fig. 2 is a similar view of a modified form.

Fig. 3 is a diagrammatical view showing another variation.

Fig. 4 is a side elevation showing one of the rail coils and its core, a portion of the casing or housing being broken away.

Fig. 5 is a cross section on the line 5—5 of Fig. 4.

Fig. 6 is a reduced plan view of the core in blank form before being bent into shape.

Fig. 7 is a diagrammatic view of a safety device for the governor.

The apparatus uses one of the steel or magnetic traffic rails 10 for maintaining running conditions of the vehicle, and a section 11 of non-magnetic material is interposed in the rail 10 at the controlling station, for producing the danger or vehicle stopping condition in the vehicle equipment, such non-magnetic section also being useful in supporting or carrying the caution and clear coils or windings.

In the arrangement as shown in Fig. 1, the vehicle equipment is provided with continually energized electro-magnets 12 having the pole pieces or arms 13 offset downwardly close to the rail 10, and said electro-magnets are fulcrumed for tilting movement, whereby the arms 13 being over the magnetic rail 10, will cause them to be attracted to said rail, whereas when the magnets pass over the non-magnetic section 11, the attraction between the arms 13 and rail is interrupted, causing the magnets to tilt by gravity with a positive and certain movement, whenever passing the controlling station. The magnetic attraction to the rail 10 can be sufficient, to hold the magnets 12 in normal position against a considerable force, so that when the magnets pass over the non-magnetic section 11, the magnetic attraction is entirely lost, and such force will assure of the positive movement of said magnets, without any liability of the magnets sticking or failing to move as intended. Such magnetic relation between the rail responsive magnets or elements 12 and the rail is equivalent to or synonymous with an inductive relation between said parts.

The electromagnets 12 resemble, in their action, the operation of ordinary relays, because when the magnets 12 pass over the non-magnetic section of the rail, they swing or move to released position, the same as the releasing of an armature of a relay when the coil is deenergized. The releasing of the magnets 12 from magnetic attraction to the rail provides a reliable method of producing or starting a danger condition in the vehicle equipment. In the present case, the magnets 12 when in normal position close the circuit of a holding electromagnet 14, the electrical energy being supplied by a battery 15 or other source of current. The conductor and its several branches leading from one pole of the battery is indicated at 16, and the conductor, with all of its branches, extending from the other pole of the battery is indicated at 21. The magnets 12, when in normal position, by engagement with contacts 17 connected to the conductor 16, establish a connection with a conductor 18 leading to one terminal of the magnet 14, and the switches thus provided by the magnets 12 are connected in multiple or parallel with one another, requiring both magnets 12 to be released, for breaking the circuit between the conductors 16 and 18. This is for the purpose of avoiding the accidental breaking of the circuit when passing over non-magnetic switch points, frogs, crossings, and the like. Thus, the magnets 12 are spaced apart longitudinally a suitable distance, so that only one of them will pass over ordinary non-magnetic portions of the track or rails, whereas both of the magnets 12 will always pass over the non-magnetic section 11 at the controlling station. It is possible, however, to eliminate one of the magnets 12, by having the pole piece or arm 13 of sufficient width or length so as not to be released in passing over non-magnetic switch points, frogs, crossings, and the like, the pole piece or arm 13 being of sufficient size so that at least a portion thereof will be over an iron or magnetic portion of the rail when passing over non-magnetic portions of the rail at crossings, switch points, frogs, and the like. Furthermore, the effect of such non-magnetic portions can be offset or neutralized by the presence of magnetic portions, to eliminate the necessity for using two magnets 12, although they can be used as a matter of precaution, if necessary, the non-magnetic section 11 of the rail being sufficiently long to assure of both of the magnets 12 being released when passing the controlling station. The circuit of the magnet 14 includes a contact 19 connected to the other terminal of said magnet, and engaging a switch slide or run-down member 20 normally attracted to and held by said magnet, and the conductor 21 is connected to the slide 20, to complete the circuit. When once the circuit is broken by the releasing of the magnets 12, the holding magnet 14 releases the slide 20, which moves by gravity, thereby breaking the electrical connection between the contact 19 and slide 20, thereby preventing the slide 20 from being reattracted by the magnet 14 even though the magnets 12 are again attracted to the rail. Thus, when once released, the slide 20 gravitates or drops, and if it completes its movement, without other conditions occurring, the vehicle equipment is brought into danger condition and the vehicle stopped.

After the slide 20 is released from the magnet 14, the downward movement of said slide is retarded to prevent the vehicle being stopped until the vehicle has travelled a sufficient distance to give the caution and clear devices an opportunity to work, thereby deferring the stopping of the vehicle, but not interrupting or interfering with the danger condition, for a short distance of movement of the vehicle, say two or three rail lengths. Thus, having received the danger indication, the vehicle will be stopped, as hereinafter described in detail, after the short distance is travelled unless the caution or clear devices have operated, thus giving such devices an opportunity of avoiding the stopping of the vehicle under caution or clear controlling conditions on the track. This distance-travel device, in the arrangement as shown, comprises a finger 22 carried by the slide 20 to drop onto a worm 23 on a rotatable vertical shaft 24. The shaft 24 is connected by a double ratchet connection 25 with the axle 26 of a pair of wheels of the vehicle or with any other part that moves when the vehicle is in motion. The double ratchet device 25 causes the shaft 24 to rotate in the same direction when the vehicle travels in either direction, whether forward or backward. The finger 22 is pivoted to the slide 20, to permit the finger to swing downwardly and move past the convolutions of the worm when the slide is raised, the finger dragging or snapping across such convolutions, but when the slide is moving downwardly or running down, the finger 22 cannot swing upwardly to be disengaged from the worm, so that, as the worm turns, the finger 22 following the worm, will allow the slide 20 to move downwardly as the vehicle moves. Thus, when the slide 20 is released from the magnet 14, the finger 22 drops onto the worm 23, and the slide then moves downwardly according to the movement of the vehicle, resulting in the vehicle being stopped if the slide is moved downwardly a predetermined amount unless other operations are performed to obtain caution or clear conditions.

In order for the vehicle to be able to move, an electromagnet 27 must be energized, and this magnet can control any suitable mechanism for applying the brakes or shutting off the power when the magnet is deenergized. In other words, the magnet 27 represents normally energized means permitting the vehicle to move and retarding or stopping the vehicle when deenergized. One terminal of the magnet is connected to the conductor 16, and a conductor 28 leads from the other terminal of the magnet 27 and is normally connected by a switch 29 with a conductor 32, said switch 29 being carried by an armature switch 30 normally attracted by a holding electromagnet 31. The conductor 32 is connected to a contact 33 engaging the slide 20 lower down than the contact 19, so that the connection between the contact 33 and slide 20 is not broken until the vehicle has travelled the required short distance after receiving the controlling indication, in passing a controlling station, resulting in the magnet 14 being deenergized. The circuit of the magnet 27 is therefore not interrupted until the slide 20 has moved downwardly out of engagement with the contact 33, dependent on the travel of the vehicle the predetermined distance at the controlling station of the track. The magnet 31 is in a normally closed circuit to keep the switch 29 closed. Thus, one terminal of the magnet 31 is connected to the conductor 16 by means of a switch 34 also carried by the armature switch 30 and normally held closed when the magnet 31 is energized. A conductor 35 leads from the other terminal of the magnet 31 to a contact strip 36 parallel with a companion contact strip 37, and the strips 36 and 37 are bridged by a switch 38 operated by a speed operated governor 39 which can be mounted on the same shaft 24 with the worm 23. The switch 38 normally connects the strips 36 and 37 when the vehicle is moving, but when the vehicle is at a stand still, the switch 38 moves downwardly below the lower ends of the strips 36 and 37 to open the circuit of the magnet 31. The strip 37 is connected by a conductor 40 with one of a pair of contacts 42, the other contact having the conductor 21 connected thereto, to complete the circuit. The connection between the contacts 42 is normally made by a step by step or progressively operable wheel or member 41. Thus, the circuit of the magnet 31 can be broken by the stopping of the vehicle, resulting in the switch 38 moving away from the contact strips 36 and 37, or by the turning movement of the wheel 41 to break the connection between the contacts 42, as will hereinafter more fully appear.

A permissive control is permitted, effective only when the vehicle has been brought to a stop, to enable the vehicle to proceed under speed control. Thus, a pair of contacts 43 are arranged to be engaged by the switch 38 when the vehicle has been brought to a stop and the governor 39 becomes dead. One contact 43 is connected to the conductor 16, and a conductor 44 leads from the other contact 43, so that the connection between the conductors 16 and 44 is only made when the vehicle is at a stand still. A normally open permissive switch 45 is provided to connect the conductor 44 with a conductor 46, but the circuit will not be closed, even though the switch 45 is closed, when the vehicle is running, because, in that event, the switch 38 would be off the contacts 43. The conductor 46 is connected to one terminal of a solenoid 47 whose core is connected to a lever 48 having a pin or stud 49 working in a slot 50 of lifting link 51 pivoted to the slide 20 whereby when the solenoid 47 is energized, the lever 48 is swung upwardly to lift the slide 20 back to normal elevated position. The slot 50 permits the slide 20 to move downwardly without interference from the lever 48 which is normally in lowered position due to the solenoid 47 being deenergized. The other terminal of the solenoid 47 is connected to a contact 52 that is only engaged by the slide 20 when the slide has almost completed its downward movement, just prior to the movement of the slide 20 away from the contact 33. Thus, the circuit of the solenoid 47 through the switch 45 is not completed unless the vehicle is at rest with the switch 38 on the contacts 43 and the slide 20 moves downwardly to engage the contact 52. In order to keep the solenoid 47 energized until the slide 20 is raised within attractive distance of the magnet 14, a contact 53 is provided to engage the slide 20 excepting when it is in its extreme upper position and held by the magnet 14, said contact 53 being engaged whenever the slide 20 is released from the magnet 14, and an armature switch 54 serves to connect the contacts 52 and 53 when the solenoid 47 has been energized to attract said switch 54. Thus, when the solenoid 47 is energized, the switch 54 is closed to connect the solenoid through the contact 53 with the slide 20 and conductor 21, thereby keeping the solenoid energized until the slide 20 is completely raised, when the slide 20 moving above the contact 53 will open the circuit of the solenoid, thereby releasing the lever 48 and switch 54 which return to normal position.

The step by step wheel 41 constitutes a part of a progressively operable device for obtaining caution and clear conditions when the required impulses or indications are received from the track, and only in that case, and the progressive movement of the wheel 41 is used for obtaining caution and then clear conditions, whereby if the wheel fails to be advanced, the danger conditions will prevail and continue. To provide for the step by step movement of the wheel or member 41, it has a series of three notches or teeth 55, 56 and 57 for the successive engagement of the pawl 58 which, as shown, is pivoted to the core 59 of a solenoid 60, the pawl normally dropping by gravity away from the wheel, and a pick-up electro-magnet 61 being provided for lifting the pawl into engagement with the teeth of the wheel. The solenoid 60 and magnet 61 are disposed in an alternating current circuit 62 having the alternating current generator 63 and condenser or capacity 64 therein. Such circuit also includes a choke coil or inductive reactance 65. This circuit is normally open so that it is ineffective excepting when passing the controlling stations of the track. For this purpose, the circuit 62 includes a pair of contacts 66 which are normally below the slide 20, and which are engaged by the slide when the slide is dropped to bring the finger 22 on the worm 23. In other words, when the controlling condition is established by the opening of the circuit of the magnet 14 by the releasing of the magnets 12, the slide 20 in dropping will establish the circuit of the choke coil 65. The condenser or capacity 64 and choke coil or inductive reactance 65 substantially balance or neutralize one another, whereby the solenoid 60 and magnet 61 are sufficiently energized to attract the core 59 and pawl 58, respectively, and the moment the circuit 62 is closed, the pawl 58 is raised into engagement with the tooth 55 of the wheel 41 and the core 59 is pulled into the solenoid 60, to turn the wheel 41 one step, such solenoid 60 and magnet 61 remaining energized unless the alternating current is influenced in some manner, which can only happen through the control of the track equipment for producing caution and clear conditions, as will hereinafter more fully appear. The choke coil 65 has a U-shaped core 67 with its terminals depending closely adjacent to the rail 10, it being noted that the coil 65 is not energized until it moves over the non-magnetic section 11 of the rail. The core or plunger 59 of the solenoid 60 is projected by means of a spring 68 when said solenoid becomes deenergized to a certain extent, thereby to return the pawl 58 for another operation of the wheel 41.

The wheel 41 is held in advanced position by means of a detent electromagnet 69 which is normally energized, one terminal of the magnet 69 being connected to the conductor 16, and a pair of contact strips 73 being disposed between the other terminal of the magnet and the conductor 21. The wheel 41 is weighted at one side of its axis so as to have a tendency to turn clockwise, as seen in Fig. 1, although any suitable means can be used for turning said wheel. The strips 73 are normally bridged by the lever 48, and when said lever is raised to its uppermost position for returning the slide 20, the lever moves off the strips 73 to open the circuit of the magnet 69 so that it becomes deenergized to release the wheel 41, and it will return of itself to normal position. This detent magnet will serve to hold the wheel 41 in advanced position without any mechanical detent or catch connection with said wheel, and the wheel, like the armature of a relay, will return to released position when the magnet 69 is deenergized. The wheel 41 has a series of armature horns or projections 70, 71 and 72 to be brought in succession adjacent to the pole of the magnet 69, for retaining the wheel 41 in any one of its progressive positions. When either horn or projection 70, 71 or 72 is attracted to and held by the magnet 69, such attraction is not sufficient to prevent the wheel 41 being moved by the pawl 58 when the magnets 60 and 61 are energized, the pull of the pawl 58 by the magnet 60 being sufficient to overcome the attraction between the wheel 41 and magnet 69. The wheel 41 is always advanced one step when passing a controlling station, inasmuch as the magnet 14 releasing the slide 20 will close the circuit of the alternating current generator 63, solenoid 60, magnet 61 and choke coil 65 by the engagement of the contacts 66 by said slide. However, unless the wheel 41 is advanced further, the danger condition will continue to exist, and the first step of movement of the wheel 41 is simply a preparatory step for the second and third steps to produce caution and clear conditions, respectively.

The second and third steps of the wheel 41 are obtained by the inductive cooperation of the choke coil 65 with coils on the track indicated at 74. Each coil or winding 74 of the track equipment is disposed on the intermediate portion of a U-shaped core 75, and when the core 67 is disposed above one of the cores 75, said cores complete a magnetic circuit, making the coil 65 the primary winding of a transformer, of which the corresponding coil 74 is the secondary winding, and each secondary coil 74 is disposed in a normally inert track circuit 76 with inductive resistance 77 and a switch 78 normally held closed by an energized magnet 79 when danger conditions exist.

The action which occurs when the energized primary or choke coil 65 passes over one of the secondary coils 74 with the switch 78 open, is as follows: The coil 65 being energized by alternating current when the slide 20 has been dropped from the magnet 14, will keep the solenoid 60 and magnet 61 energized to hold the core 59 and pawl 58 in attracted position, respectively, and when the core 67 moves over and registers with the core 75, the magnetic circuit is completed through the cooperating cores, whereby the alternating magnetic flux passing through the core 75 will increase the inductive reactance of the coil 65, and resulting in the coil 65 producing a choking effect, whereby the current in the circuit 62 drops. This drop in current is sufficient to deenergize the solenoid 60 and magnet 61 enough to release the core 59 and pawl 58, which return to normal position, and as soon as the coil 65 has moved past the coil 74, the choking effect is eliminated, and the solenoid 60 and magnet 61 are again reenergized sufficiently to attract the core 59 and pawl 58 so as to advance the wheel 41 a second step, the pawl engaging the second ratchet tooth 56 and the armature horn 71 moving into a position to be attracted to and held by the magnet 69. If the coil 65 passes the second secondary coil 74 with the switch 78 of its circuit open, a second choking action is provided in the circuit 62, whereby the coil 65 in passing the second coil 74 will result in the wheel 41 being moved a third step, but if only one of the switches 78 is open, the wheel 41 will only be moved a second step, producing caution conditions, whereas the third step will produce clear conditions. In this way, the wheel 41 is advanced step by step to obtain the progressive action to caution and clear conditions after the vehicle equipment has been started in its danger operation to result in the stopping of the vehicle if permitted to be consummated. The switches 78 are normally opened under clear conditions, by the energized magnets 79. The magnets 79 are disposed in circuits controlled by the wayside signal apparatus, whereby both magnets 79 are deenergized for clear conditions, and both magnets are energized for danger conditions, whereas one magnet is deenergized and the other energized for caution conditions. Any suitable means of control for the circuits of the magnets can be used, such as employed in wayside signal apparatus, this being no part of the present invention, and being apparent to those skilled in the art. In fact, the switches 78 can be controlled by any suitable means, or manually, so that both switches are closed for danger conditions, both switches opened for clear conditions, and one switch closed and the other opened for caution conditions. It will be noted that when the coil 65 passes over either coil 74 with the corresponding switch 78 closed, the circuit 76 is closed, and current can be induced in the circuit 76, whereby the choking effect in the coil 65 is avoided, and the solenoid 60 and magnet 61 will therefore remain energized sufficiently to hold the core 59 and pawl 58. It will also be noted that the circuits 76 require no electrical energy, reducing the cost of track maintenance of the apparatus to a minimum.

Another notable advantage in the use of the non-magnetic section 11 of rail resides in the fact that each secondary coil 74 can be associated with such non-magnetic section, preferably underneath same, as shown in detail in Figs. 4, 5 and 6. The core 75 is of H-shape when laid out flat or in blank form, as seen in Fig. 6, and is preferably of laminated construction, being composed of superposed sheets of iron. Such core has the intermediate yoke portion 80, the oppositely extending lateral arms 81 at the ends of the yoke portion 80, and the pole portions 82 at the ends of said arms. The coil 74 is wound on the intermediate yoke portion 80, and the arms 81 are bent upwardly and inwardly to extend around and over the base flanges of the rail, as seen in Fig. 5, with the pole portions 82 bearing against the web of the rail snugly underneath the head or tread. The core is secured to the rail by bolts 83 extending through the portions 82 and web of the rail, or in any other suitable manner. The core 75 is thus securely fastened to the rail around the lower portion or base thereof with the terminals or pole portions of the core close underneath the tread surface of the rail, and the yoke portion 80 and coil 74 underneath the rail out of the way, so that there is practically no possibility of the core or coil being interfered with, broken off, or damaged. This association of the core and its coil with the rail is only feasible by using the non-magnetic section of rail with which the coil and core are assembled, and this also provides for the permanent and secured positioning of the coil on the track or road bed, with the minimum possibility of the removal, loosening or damage to the coil and core. In fact, the rail serves as a protection to the coil and core, and they do not constitute an undesirable obstruction on the track or road bed. The rail being of non-magnetic material at this point will leave the magnetic circuit between the pole portions 82 open, to be completed by the core 67 of the vehicle-carried choke coil 65, and the magnetic flux established by the coil 65 will therefore pass through the core 75 when the coil 65 passes over the coil 74. The coil 74 can be encased to protect it from water, snow, and the like, and, as shown, a casing 84 is disposed under the rail to house said coil. There is nothing movable about the track device, therefore, and the inductive relation or cooperation between the track and vehicle equipment is obtained with a minimum number of parts, and with a minimum of objection and cost, it only being necessary to provide the non-magnetic section 11 of rail which also carries the secondary coils 74 to provide for caution and clear indications or signals. The electro-magnets 79 and switches 78 can be part of the usual semaphore or wayside signal system. Each core 75 is preferably bent into shape before being applied to the rail, and can be slid longitudinally onto the rail to the proper position thereon.

In order that when the wheel 41 is advanced two steps, the electromagnet 31 be deenergized, said wheel has the insulating segment 86 to be moved against the contacts 42, in the second and third steps of the wheel 41, to open the circuit of the magnet 31 between the conductors 21 and 40, thereby permitting the switch 30 to drop. The second and third steps of the wheel 41 are also employed for restoring the slide 20 and wheel 41 after the vehicle has moved the required distance at the controlling station. Thus, a pair of contacts 87 normally bear against the insulating segment 86, one contact being connected to the conductor 16 and the other to the conductor 46, and said contacts are only bridged by the wheel 41 when said wheel has moved the second or third step, which will close the circuit between the battery 15 and solenoid 47, when the slide 20 has been moved downwardly to engage the contact 52, thereby energizing the solenoid to restore the slide 20 as hereinbefore described. The raising of the lever 48 off of the strips 73, will open the circuit of the holding or detent magnet 69, thereby releasing the wheel 41 when the lever 48 has been completely raised and the slide 20 returned to position to be held by the magnet 14. The circuit 62 also includes a pair of contacts 88 normally bridged by the lever 48 when it is in its lowered position, so that when said lever is raised for restoring the slide 20, the circuit 62 is opened, thereby deenergizing the solenoid 60 and magnet 61 so that the pawl 58 will be returned to normal idle position. In other words, the circuit 62 is broken the moment the lever 48 is raised, to release the pawl 58 from the wheel 41, and the magnet 69 remains energized until the lever 48 is completely raised, to allow for the raising of the switch 30 under clear conditions, as will hereinafter more fully appear. In other words, the wheel 41 is not released by the detent magnet 69 until the slide 20 is returned to its normal elevated position.

The switch 30 is restored when the wheel 41 is moved the third step, to clear position, by the successive impulses or indications in the circuit 62 which is responsive to the track equipment for restoring clear conditions. Thus, a pair of contacts 89 bear against the wheel 41 and normally touch an insulating segment 90 on said wheel, to keep the corresponding circuit open, and the wheel 41 has an insulated switch segment 91 to bridge the contacts 89, when the wheel 41 has been moved the third step. One of the contacts 89 is connected to the conductor 21, and a conductor 92 leads from the other contact 89 and is connected to a second winding or coil 93 of the magnet 31. The other terminal of the coil 93 is connected by a conductor 94 with another contact 95 bearing on the insulating segment 86 and connected by the wheel 41 (when the wheel is in its third position) with the conductor 16 leading to the battery 15. Consequently, when the wheel 41 has been moved to its third position, the circuit of the coil 93 is closed, thereby raising the switch 30 and companion switches 29 and 34, and holding them up against the contacts until the main coil or winding of the magnet 31 is again energized, it being noted that in the third position of the wheel 41 the armature horn 72 thereof is attracted to the magnet 69 and the wheel 41 held until the slide 20 is restored to normal position, whereby the wheel 41 in returning to normal position on account of the deenergization of the magnet 69 will again close the circuit of the magnet 31 to retain the switch 30 attracted to said magnet.

Under caution conditions the vehicle is under speed control, requiring the vehicle to travel at a speed of say fifteen miles per hour or less. Such limited speed control exists when the armature switch 30 is released from the magnet 31. Thus, a switch 96 is moved by the governor 39 to bridge a pair of contact strips 97 when the vehicle is travelling below the maximum caution speed, said switch moving off said strips when such speed is exceeded, to open the corresponding circuit. One of the strips 97 is connected by a conductor 98 with the conductor 28, whereby the circuit of the magnet 27, instead of being completed between the conductors 28 and 32 by the switch 29, is completed through the conductor 98 and speed control switch 96 as will presently appear. The other strip 97 is connected by a conductor 99 with the switch 30, and said switch when dropped engages a contact 100 connected by a conductor 101 with the conductor 32. Therefore, when the switch 30 drops, the circuit of the magnet 27 by way of the switch 29 is opened, but such switch 29 is shunted by the switches 96 and 30, which are connected in parallel with the switch 29, so that when the switch 29 is opened, the circuit of the magnet 27 is completed by the switches 96 and 30, provided the vehicle is travelling below the maximum speed permitted under caution control. In order to prevent the magnet 27 being deenergized, should the vehicle be travelling above caution speed in passing the controlling station, with the switch 96 open, until the predetermined distance has been travelled by the vehicle, to give the clearing device an opportunity to operate, the switches 96 and 30 are shunted by the wheel 41, when in its second position. Thus, a conductor 102 is connected to the conductor 28, and a conductor 103 is connected to the conductor 32, so that even though a caution signal or indication has been received by the vehicle equipment, and the vehicle is travelling at a high speed, the magnet 27 will not be deenergized until the vehicle has moved the required distance. Thus, with the switch 96 open, the circuit of the magnet 27 is completed by the conductors 102 and 103 which are connected by the switch segment 91 of the wheel 92 in the second position of said wheel, thereby completing the circuit of the magnet 27 between said magnet and the contact 33, and keeping such circuit closed until the vehicle has completed the required distance and the slide 20 is removed from the contact 33. If the caution condition prevails, the slide 20 engaging the contact 52, will result in the solenoid 47 being energized to restore the slide 20, thereby deenergizing the magnet 69 and permitting the wheel 41 to return. This will break the connection between the conductors 102 and 103 thereby leaving the switches 96 and 30 as the only connections to complete the circuit of the magnet 27, so that if the vehicle is travelling above the permitted speed, the switch 96 being opened will result in the magnet 27 becoming dead, to retard the vehicle until its speed is below the maximum speed permitted under caution control, when the switch 96 bridges the strips 97.

As a means for clearing the vehicle equipment at the end of the block, when under caution control, the releasing of the magnets 12, when entering the next block, is used for energizing the lifting coil 93 of the switch 30. Thus, a conductor 105 is connected between the conductors 16 and 94 and has the contacts 106 to be engaged by the arms 13 when they are raised by the releasing of the magnets 12, said arms providing switches connected in series in the conductor 105, to require both magnets 12 to be released for closing the corresponding circuit, whereby the releasing of one magnet only at a time, such as when crossing over a non-magnetic switch point, frog, or the like, will not close the circuit prematurely. However, when the magnets 12 both pass over the non-magnetic section 11 in passing a controlling station, the circuit through the conductor 105 is closed. A contact 107 is connected to the conductor 92 and is slightly below the contact 19 to engage the slide 20, making it necessary that the slide 20 be in raised position, to complete the circuit of the coil 93 by way of the arms 13. In leaving a block under caution control and passing a controlling station in entering the next block, the magnets 12 in being released will not only deenergize the magnet 14, but said magnets in being released to bring the arms 13 against the contacts 106 will also close the circuit of the coil 93, the slide 20 closing the circuit sufficiently long to enable the coil 93 to pick up the switch 30 before the slide leaves the contact 107. The switch 30 is thus restored when moving from the caution block into the next block, whereby the vehicle equipment can be placed in danger, caution or clear according to the conditions.

*Operation—Running conditions.*

While travelling in a block, running under clear conditions, the several devices are in the normal positions as shown in Fig. 1, and the switch 96 may be in or out of engagement with the strips 97 according to the speed of the vehicle. The magnets 12 being normally energized and attracted to the magnetic rail 10, will keep the circuit of the magnet 14 closed, such circuit including the battery 15, conductor 16, contacts 17, conductor 18, magnet 14, contact 19, slide 20 and conductor 21. The running magnet 27 is normally energized to permit the vehicle to move, and the circuit includes the battery 15, conductor 16, magnet 27, conductor 28, switch 29, conductor 32, contact 33, slide 20 and conductor 21. The magnet 31 normally holds the switch 30 raised, and is disposed in the circuit including the battery 15, conductor 16, magnet 31, conductor 35, contact strips 36 and 37 and switch 38, conductor 40, contacts 42 and wheel 41, and conductor 21, whereby either the stopping of the vehicle to open the connection between the strips 36 and 37, or the moving of the wheel 41 to its second position will open the circuit of the magnet 31. The detent magnet 69 is normally energized by being disposed in the circuit including the battery 15, conductor 16, contact strips 73 and lever 48, and conductor 21.

During such running conditions under clear control, should the circuit of the magnet 14 fail, the slide 20 would be released and would move downwardly to open the circuit of the magnet 27 between the slide 20 and contact 33, thereby bringing the vehicle to a stop. Should the circuit of the magnet 27 fail, said magnet would of course be deenergized to stop the vehicle. Should the governor 39 gravitate by the breaking of the connection between the governor and axle or other driving member, the switch 38 moving off the strips 36 and 37 would open the circuit of the magnet 31 thereby releasing the switch 30 and placing the vehicle under caution control at once. Such provisions and others avoid the possibility of the vehicle proceeding under clear conditions with the apparatus defective.

It will also be noted that the magnets 12 and coil 65 carried by the vehicle are disposed over the rail and do not make contact with any devices on the track, and said magnets and coil can also be located behind wheels of the vehicle, to be protected, so that there is no possibility for said magnets or coil being knocked off, broken, injured or displaced, in view of the fact that the wheels in advance serve to protect such responsive devices of the vehicle equipment, giving the greatest assurance that said devices will remain in place.

*Danger conditions.*

Danger conditions exist when the circuits 76 are closed, by the closing of the switches 78, so that no corresponding responses of the caution and clear producing devices of the vehicle equipment can be had. Thus, when the vehicle passes the controlling station of the track, both magnets 12 in passing over the non-magnetic section 11 will be released, to break the connections between the conductors 16 and 18, thereby resulting in the magnet 14 being deenergized, to release the slide 20, and the moment the slide is released, the circuit is also broken between the contact 19 and slide, to prevent the slide 20 being picked up by said magnet 14 even though the magnets 12 are reattracted to the rail, unless said slide is intentionally lifted by the lifting device. The slide 20 now starts its downward journey, the finger 22 having seated on the worm 23 and the worm retarding the gravitation of the slide according to the movement of the vehicle. When the predetermined distance has been travelled, so that the slide 20 is removed from the contact 33, the circuit of the magnet 27 is opened, thereby resulting in the brakes being applied and the vehicle is brought to a stop. Should either the finger 22 or worm 23 be broken off or removed, the slide 20 could gravitate immediately to its lowermost position, when the magnet 14 is deenergized, to give the danger indication and deenergize the magnet 27 immediately. Should the worm 23 not be turning, by being disconnected from the driving member, this would also produce a danger condition, as hereinafter described in connection with the device shown in Fig. 7. Therefore, unless other responses are received by the vehicle equipment from the track equipment, which cannot happen unless the switches 78 are open, the vehicle equipment will go to danger and stop the vehicle.

Whenever passing the controlling station, regardless of the conditions, the slide 20 in being released by the magnet 14 will bridge the contacts 66, to close the circuit of the solenoid 60 and magnet 61. Such circuit is normally open, requiring such circuit to be closed for receiving the impulses to produce caution or clear conditions, and the failure of the circuit will be on the side of safety, leaving the vehicle equipment under danger control. Thus, when the slide 20 closes the circuit 62, after the magnet 14 has been deenergized, the alternating current generator 63 will immediately energize such circuit, and the magnet 61 will pick up the pawl 58 and bring it into engagement with the tooth 55, while the solenoid 60 will attract the core 59 and move the pawl 58 to advance the wheel 41 one step, bringing the armature horn 70 into position to be attracted to and held by the detent magnet 69. This first step of the wheel 41 occurs whenever passing a controlling station, with the circuit 62 operative, and if danger conditions exist, nothing else happens in such circuit and the wheel 41 remains in its first position until the vehicle has been brought to a stop.

*Permissive control.*

When the vehicle has been stopped, and only then, can the vehicle proceed again, and then only under speed control or caution conditions. Thus, when the vehicle has stopped, the switch 38 moving below the strips 36 and 37, will open the circuit of the magnet 31, thereby releasing the armature 30 and opening the switch 29, the armature 30 engaging the contact 100. The circuit of the magnet 27 by way of the switch 29 is therefore opened, and the circuit of the magnet 27 now includes the battery 15, conductor 16, magnet 27, conductor 28, conductor 98, contact strips 97 and switch 96, conductor 99, switch 30, contact 100, conductor 101, conductor 32, contact 33, slide 20 (after same has been raised in the manner indicated below) and conductor 21. The magnet 27 is therefore reenergized, to permit the engineer to release the brakes, and permit the vehicle to proceed, but if the speed exceeds that permitted, the switch 96 moving off the strips 97 will open the circuit and will again deenergize the magnet 27. This requires that the vehicle keep within the reduced speed necessary to keep the switch 96 closed.

In order that the vehicle will not be stopped upon reaching the next controlling station, and to enable the caution control to be set aside if conditions are clear, the operator is required to close the switch 45 after the vehicle has been stopped, in order to restore the slide 20. The switch 45 being closed, completes the circuit including the battery 15, conductor 16, contacts 43 and switch 38 (requiring the vehicle to be stopped), conductor 44, switch 45, conductor 46, solenoid 47, contact 52, slide 20 (in lowered position when the vehicle has been stopped) and conductor 21. If the circuit is effective, the solenoid 47 is energized to raise the lever 48 and restore the slide 20, it being noted that when the solenoid 47 is energized, the switch 54 is closed to make the connection between the contacts 52 and 53, thereby retaining the solenoid 47 energized until the slide 20 returns to a position to be re-attracted to the magnet 14, when the circuit is broken between the slide 20 and contact 53. The switch 54 therefore opens at once after contact between the contact 52 and slide 20 is broken, and the lever 48 drops. The lever 48 having been raised, breaks the connection of the circuit of the magnet 69 between the strips 73, so that the magnet 69 is deenergized to release the wheel 41, such wheel 41 returning to normal position whenever the lever 48 is raised to restore the slide 20. The vehicle having moved past the controlling station which produced the danger condition and stopping of the vehicle, results in the magnets 12 having been re-attracted to the rail, so that when the slide 20 is raised into engagement with the contact 19, the circuit of the magnet 14 is again closed, to support the slide 20 in normal running position. Should the solenoid 47 fail to return the slide 20, said slide will remain in lowered position to maintain the danger condition, inasmuch as the slide 20 remains in lowered position to keep the vehicle equipment from being cleared. The vehicle would remain under caution control, the same as when the vehicle was stopped, and if the switch 30 is raised by the coil 93 in passing the next controlling station, the circuit of the magnet 27 would be opened and the vehicle stopped at once. Even though the switch 30 is not raised by the coil 93 in passing the next controlling station, the equipment would remain under caution control. Furthermore, with the slide 20 in lowered position, and the switch 30 also in lowered position, the circuit of the magnet 27 would be broken between the contact 33 and slide 20, so that it requires the slide 20 to be raised and retained in raised position by the magnet 14, to even proceed under caution control. In other words, before being able to proceed under speed control, after being stopped, the switch 45 must be closed, and the solenoid 47 must be energized to raise the slide 20 so that it can be held by the magnet 14, for otherwise the danger condition will continue.

Caution conditions.

When the vehicle passes a controlling station with one of the circuits 76 closed and the other opened, this will place the vehicle equipment in caution condition, if the apparatus is functioning properly. Thus, the same as when danger conditions exist, the magnet 14 is deenergized when the magnets 12 move over the non-magnetic section 11, and the slide 20 is released and starts downwardly. The closing of the circuit 62 will result in the solenoid 60 and magnet 61 being energized to move the wheel 41 one step, as is always the case when the magnet 14 is deenergized and the circuit 62 closed and in operative condition. The slide 20 has started down to stop the vehicle, should the circuit of the magnet 27 be broken between the contact 33 and slide 20. However, should the caution device function properly, the coil 65 in passing over the coil 74 of the open circuit 76, will result in the choking action in the circuit 62 by the increased reluctance produced, as hereinbefore described, so that the solenoid 60 and magnet 61 are sufficiently deenergized to release the pawl 58, which will return to normal released position. If such choking effect has been properly brought about, the moment the coil 65 has passed the coil 74, the circuit 62 is reenergized to the full extent, thereby sufficiently reenergizing the solenoid 60 and magnet 61 to again lift and advance the pawl 58, which in engaging the tooth 56, will turn the wheel 41 the second step. The circuit 62 is normally resonant, and it requires the choking effect, to obtain the second movement of the pawl 58, to advance the wheel 41 to its second position (caution position). When the wheel 41 has been moved to its second position, the insulating segment 86 moving against the contacts 42, will open the circuit of the magnet 31, thereby letting the switch 30 drop to connect the circuit of the magnet 27 through the speed-control switch 96. This will immediately establish caution control as soon as the vehicle has moved the required distance at the controlling station (slightly less than the length of the rail section 11), but such speed control is not effective until such short predetermined distance has been travelled by the vehicle, to give the clearing device an opportunity to work if conditions are clear. Thus, should the vehicle be travelling at a high speed when receiving the caution indication, the switch 96 being open would ordinarily open the circuit of the magnet 27 at once, as soon as the switch 30 drops, but the wheel 41 having been moved to its second position so that the switch segment 91 connects the conductors 102 and 103, the circuit of the magnet 27 is not broken until the required distance has been travelled. Thus, the circuit of the magnet 27 during the travel through the predetermined distance at the controlling station (the switch 96 being open) includes the battery 15, conductor 16, magnet 27, conductor 102, switch segment 91, conductor 103, conductor 32, contact 33, slide 20, and conductor 21. The magnet 27 is thus prevented from being deenergized until the required distance has been travelled to give the clear device an opportunity to operate. The distance between the entrance end or the rail section 11 and the first coil 74 is such that the armatures 13 are released from the rail section 11 and the slide 20 moved into engagement with the contacts 53 and 66 and out of engagement with the contacts 19 and 107, before the coil 65 passes over the first coil 74. Also, the slide 20 will not be removed from the contact 33 until the coil 65 has passed both track coils 74 to prevent the danger conditions being established until the coil 65 has been given an opportunity of being affected by the track coils or devices. Now, when such distance has been travelled and the slide 20 has been lowered to engage the contact 52, with the wheel 41 in its second position to bridge the contacts 87, the circuit of the solenoid 47 is automatically closed, said circuit including the battery 15, conductor 16, contacts 87 and wheel 41, conductor 46, solenoid 47, contact 52, slide 20 and conductor 21. The slide 20 is thus raised to be held by the magnet 14 which is reenergized by the reattraction of the magnets 12 to the magnetic portion of the rail beyond the non-magnetic section 11, and the slide 20 must be returned to raised position and held to avoid danger conditions which exist when the slide 20 is in its lowered position. As hereinbefore indicated, the switch 54 keeps the solenoid 47 energized until the slide 20 is in complete raised position, when the circuit of the solenoid 47 is opened. The slide 20 is thus restored, and the lever 48 having been raised, opens the circuit of the magnet 69 so that the wheel 41 returns to normal position. The vehicle equipment is now in caution condition, restricting the speed of the vehicle, because the switch 96 will open and deenergize the magnet 27 if the permissive speed is exceeded.

The caution condition or speed control continues, either under permissive control after the vehicle is stopped, or under caution control by a caution indication, until the vehicle reaches the end of the block. Thus, when the vehicle passes from one block to the other, so that the magnets 12 are released, a circuit is closed including the battery 15, conductor 16, contacts 106, conductor 105, conductor 94, lifting coil 93, conductor 92, contact 107, slide 20 (which must be in raised position) and conductor 21. The coil 93 can therefore be energized, for raising the switch 30 and restoring same to normal clear position. This happens as soon as the magnets 12 are released, resulting in the magnet 14 being deenergized and the slide 20 dropped, so that the circuit of the coil 93 is opened the moment the slide 20 leaves the contact 107, to prevent the coil 93 remaining energized. The vehicle equipment is thus in normal running condition the moment the magnets 12 are released, but the magnet 14 being simultaneously deenergized, thereby again starts the slide 20 in its movement to produce a danger condition unless same is avoided by the caution and clear indications from the track equipment.

Clear conditions.

In order that the vehicle may pass the controlling station without being stopped or the speed restricted, both of the circuits 76 must be open, so that the circuit 62 can receive the choking effect twice in succession, one choking effect producing a caution condition, as hereinbefore described, and the second choking effect operating the pawl 58 to engage the tooth 57 and move the wheel 41 to its third position.

As hereinbefore described, when the first choking effect in the circuit 62 is established and removed, the pawl 58 is operated to advance the wheel 41 to its second position, in which case the armature horn 71 of the wheel 41 is attracted to and held by the detent magnet 69. When the second choking effect occurs in said circuit, by the proper action between the vehicle and track devices, the pawl 58 engages the third tooth 57 and moves the wheel 41 to its third position, the armature horn 72 being brought adjacent to and held by the magnet 69. Even though the wheel 41 has been moved to its second position, so that the circuit of the magnet 31 is opened between the contacts 42, and the switch 30 has dropped, the opportunity is afforded for the wheel 41 being advanced the third step, during the required distance of travel at the controlling station. If such third step of the wheel 41 is made, the contact 95 is engaged by the wheel 41 beyond the insulating segment 86, and the contacts 89 are also bridged by the switch segment 91. This is for the purpose of restoring the switch 30 under clear conditions, by closing the circuit including the battery 15, conductor 16, contact 87, wheel 41, contact 95, conductor 94, coil 93, conductor 92, contacts 89 and segment 91, and conductor 21. The third step of the wheel 41 therefore closes the circuit of the coil 93 to restore the switch 30 and avoid speed control of the vehicle under clear conditions, and when the distance has been travelled at the controlling station, the slide 20 in engaging the contact 52, will result in the solenoid 47 being energized as hereinbefore pointed out, to restore the slide 20 after the magnets 12 have moved beyond the non-magnetic section 11. The magnet 27 is maintained energized because of the fact that the segment 91 bridges the pair of contacts 89 in addition to bridging the conductors 102 and 103, in the third position of the wheel 41, and the circuit includes the battery 15, conductor 16, magnet 27, conductor 102, segment 91, corresponding contact 89, and conductor 21. The slide 20 being raised will result in the circuit of the magnet 69 having been opened by the movement of the lever 48 above the contact strips 73, so that the wheel 41 is returned to normal position at the same time that the slide 20 is moved adjacent to and held by the magnet 14. The wheel 41 having been returned to normal position, reestablishes the circuit of the magnet 31 between the contacts 42, and opens the circuit of the coil 93, the switch 30 therefore being retained in raised position inasmuch as the magnet 31 becomes reenergized when or immediately after the coil 93 becomes deenergized, to avoid the switch 30 dropping during the change. The vehicle equipment is thus restored to running condition with the devices in the positions as seen in Fig. 1.

It will therefore be observed that whenever the vehicle passes a controlling station, a condition is established in the vehicle equipment that will result in the vehicle being stopped, unless the required actuations for caution and clear conditions occur, and the chances for false caution and clear indications are reduced to the minimum, the danger condition being made as certain as possible. The coils 74 being associated with the traffic rail, so that the coil 65 can travel close to such rail, provides for as close a connection between the cores 67 and 75 as can be obtained, it being noted that the coils are not apt to be knocked off, or damaged, as would be the case if the coils were placed between or at the outer sides of the rails. A predetermined small clearance between the cores 67 and 75 is established, to make the action in the circuit 62 effective should the circuits 76 be open, thereby giving assurances against accidental danger condition of the vehicle equipment, if the track conditions are clear or caution, and also avoiding an accidental caution condition if the track conditions are clear. The apparatus is so designed that accidental failures of the apparatus to function will produce danger conditions, and if the magnets 12 are energized, they will be released with certainty when passing over the non-magnetic section 11, to assure of the vehicle equipment being brought to danger condition when traffic conditions are such or should the apparatus fail. The rail section 11 need not have any relation to the braking distance of the train, although it is desirable to have the control station located a braking distance from the wayside semaphore or signal device, so that the train can be stopped, if necessary, before passing the semaphore.

Modifications.

The apparatus shown in Fig. 2, in the most part, is the same as that shown in Fig. 1, and the operation is also the same, excepting as here noted. Thus, the inductive resistances of the circuits 76 are substituted by the batteries 77′ or other source of energy, for energizing the coils 74 to produce magnetic flux between the terminals of of the cores 75 along and above the tread of the rail, it being noted that the non-magnetic section 11 results in the magnetic flux being effective above the rail, which would not be the case if the coils 74 were applied to a magnetic rail. The solenoid 60 is disposed in a circuit including the battery 15, conductor 16, normally closed switch 67′, solenoid 60, contacts 88, contact 66′, slide 20 (when released from the magnet 14) and conductor 21. Such circuit is normally opened, but is closed when the slide 20 drops in passing a controlling station, the first closing of the circuit 62′ energizing the solenoid 60 to advance the wheel 41 one step. If the circuits 76 are open, the switch 66′ remains closed, and the apparatus stops the vehicle. If one coil 74 is energized by the closing of the corresponding circuit 76, the switch 67′ is opened once and reclosed, such switch having an armature 65′ to be attracted to the coil 74 in passing same, whereby the switch 67′ is opened, to be reclosed after passing the energized coil 74. This will deenergize the solenoid 60 and reenergize same to move the wheel 41 the second step to produce caution conditions. If both coils 74 are energized, the armature 65 will be attracted to the rail twice, thereby breaking and making the circuit of the solenoid 60 twice in succession, to move the wheel 41 to its third position to restore clear conditions. Instead of using the lifting magnet 61, the pawl 58 can have a cam 61′ to raise the pawl into engagement with the ratchet teeth of the wheel 41 when the pawl 58 is moved by the attraction of the core 59 into the solenoid. By using the battery 15 in the circuit 62′, the switch 54 can make a connection between the contact 52 and contact 66′, without the need of using the three separate contacts 53 and 66 as in Fig. 1.

Otherwise than above stated, the apparatus and operation thereof are the same as described in connection with Fig. 1. The choking effect in the alternating current circuit of the appartus as shown in Fig. 1 is replaced or substituted by the arrangement as shown in Fig. 2 using the magnetic attraction of the armature 65′ to the coils 74 to obtain the caution and clear conditions. This, however, requires a source of current for energizing the coils 74, which is not required with the inductive devices shown in Fig. 1. However, in the arrangement shown in Fig. 2, the circuits 76 must not only be closed, but must be energized to obtain the responsive action of the armature 65′ on the vehicle when passing a controlling station of the track. This provides a normal danger arrangement, inasmuch as the failure of the current for the track magnets, or the breaking of the track circuits, will result in the failure of the armature 65′ to be actuated by the track devises, so that the vehicle equipment will go to danger condition.

Fig. 3 shows another inductive arrangement for obtaining the release of the slide 20 from the magnet 14 when passing a controlling station where the non-magnetic section 11 of rail is located. This is also accomplished without the movement of parts, such as the movement of the magnets 12, by using the choke coils 12′ disposed on cores 13′ that have their terminals disposed close above the rail. The coils 12′ are connected in parallel or multiple in a circuit 18′ that is energized by the alternating current generator 63, and said circuit includes the primary winding 110 of a transformer and also a condenser or capacity 111. Such alternating current circuit 18′ is normally resonant by the provision of sufficient capacity 111 to balance or neutralize the inductive reactance of the coils when the cores 13′ are over the magnetic portion of the rail 10, which magnetic portion of the rail completes the magnetic circuits of the cores 13'. The secondary winding 112 of the transformer is in circuit with the electromagnet 14, which is an alternating-current magnet, and the circuit of said magnet includes the contacts 19' normally bridged by the slide 20. Such magnet circuit also includes the condenser or capacity 113.

This arrangement can take the place of the magnets 12 and their circuit with the magnet 14. Thus, when travelling in the block with the cores 13' over the magnetic portion of the rail, the magnetic circuits of the coils 12' being completed by such rail, will result in the generator 63' establishing maximum energization of the primary winding 110, to induce sufficient current in the secondary winding 112 and its circuit, to keep the magnet 14 sufficiently energized to support the slide 20. When passing a controlling station, both coils 12' moving over the non-magnetic section of rail, will result in the magnetic circuits of the cores 13' being opened, the same as if said cores were removed a considerable distance from the magnetic rail, inasmuch as the non-magnetic section 11 simply leaves an air or non-magnetic gap between the terminals of the cores 13'. This increases the magnetic reluctance in the cores 13', creating a choking effect in the coils 12', and reducing the current flowing through the winding 110, whereby to sufficiently reduce the current induced in the winding 112 so that the magnet 14 is sufficiently deenergized to release the slide 20. The electromagnet 14 is such that when the choking effect is obtained by the movement of the coils 12' above the non-magnetic section of rail, said magnet will positively release the slide 20, and said slide in moving away from the contacts 19' will leave the circuit of the magnet 14 open until said slide is restored as hereinbefore described.

By using the choke coils 12' to obtain the release of the slide 20 from the magnet 14, when passing over the non-magnetic section of the rail, and by using the choke coil 65 passing over the coils 74 to obtain the caution and clear conditions after the slide 20 has been released, a desirable induction apparatus is provided, wherein the coils on the track are protected by the rail, and the coils or devices of the vehicle cooperable with the track equipment move over the rail to be protected by the wheels of the vehicle or train, so that the cooperating vehicle and track devices are not apt to be knocked off, damaged or interfered with, without any contacting members between the vehicle or track, and without any movable parts in the cooperating vehicle and track devices. The induction and magnetic devices of the modifications shown and described are equivalents of each other, inasmuch as magnetic flux is used in each case, and when magnetically operable devices between the vehicle and track are mentioned in the appended claims, same are to also include inductive devices also.

In order to assure that the slide 20 will move downwardly, should the governor 39 fail, due to the breaking of the connection between the shaft 24 and the driving axle or member, a safety device is used, such as shown in Fig. 7, or an equivalent arrangement can be substituted. As shown, the worm 123 is slidably mounted on the shaft 24, and carries a core 120 of a solenoid 121, said core and solenoid preferably surrounding the shaft 24, and when the solenoid is energized, the core 120 is raised for raising the worm 123 to normal operative position. The circuit 122 of the solenoid 121 includes the battery 15 and the contact strips 36 and 37 normally bridged by the switch 38 when the governor is running, so that when the governor stops, by the stopping of the vehicle or the breaking of the operative connection with the governor, the circuit 122 is opened by the switch 38 moving below the strips 36 and 37, resulting in the solenoid 121 being deenergized. The worm 23 and core 120 will therefore drop, so as to offer no obstruction to the downward movement of the slide 20 inasmuch as the worm 23, in this case, does not stop the downward movement of the finger 22. The apparatus will therefore go to danger immediately when the slide 20 is released from the magnet 14. The governor 39 must therefore be in working condition and the worm 23 rotating, when passing a controlling station of the track, to keep from getting a danger indication at once when the slide 20 is released. This assures of the slide 20 moving downwardly even though the worm 23 is not turning.

Having thus described the invention, what is claimed as new is:—

1. A vehicle controlling apparatus including means operable when the vehicle passes a controlling station of the track to produce vehicle stopping conditions, and means operable during the movement of the vehicle past said controlling station for obtaining speed control conditions of the vehicle and then clear conditions.

2. A vehicle controlling apparatus including means operable when the vehicle passes a controlling station of the track to produce a predetermined vehicle controlling condition, and means operable during the movement of the vehicle past said station for obtaining other controlling conditions progressively.

3. A vehicle controlling apparatus including means operable when the vehicle passes a controlling station of the track to produce a vehicle stopping condition, and means operable during the movement of the vehicle past the controlling station for obtaining speed control and clear conditions progressively.

4. A vehicle controlling apparatus including means operable when the vehicle passes a controlling station of the track to produce, after an interval, a predetermined vehicle controlling condition, and means operable during such interval for obtaining other controlling conditions progressively.

5. A vehicle controlling apparatus including means operable when the vehicle passes a controlling station of the track to produce, after an interval, a vehicle stopping condition, and means operable during such interval for obtaining speed control and clear conditions progressively.

6. A vehicle controlling apparatus including means operable when the vehicle passes a controlling station of the track to produce a predetermined vehicle controlling condition when the vehicle has travelled a predetermined distance, and means operable during the travel of the vehicle in such distance for obtaining other controlling conditions in succession.

7. A vehicle controlling apparatus including means operable when the vehicle passes a controlling station of the track to produce a vehicle stopping condition when the vehicle has travelled a predetermined distance, and means operable during the travel of the vehicle in such distance for obtaining speed control and clear conditions of the vehicle progressively.

8. A vehicle controlling apparatus including the magnetic rail of the track having a non-magnetic section at a controlling station, vehicle-carried means for maintaining the vehicle in running condition including a device having a magnetic relation with said magnetic rail and affected when said device passes the non-magnetic section, said means being operable when said device is so affected to produce, after an interval, vehicle retarding conditions, and means operable during such interval for eliminating said conditions.

9. A vehicle controlling apparatus including the magnetic rail of the track having a non-magnetic section at a controlling station, vehicle-carried means for maintaining the vehicle in running condition including a device having a magnetic relation with said magnetic rail and affected when passing the non-magnetic section, said means being operable when said device is so affected to produce, after an interval, vehicle retarding conditions, and means operable during such interval for eliminating said conditions including a controlling device assembled with said non-magnetic section.

10. A vehicle controlling apparatus including a magnetic rail of the track having a non-magnetic section at a controlling station, vehicle-carried means including a device having a magnetic relation with said magnetic rail and affected when passing the non-magnetic section, said means being operable when said device is so affected for obtaining, after an interval, a vehicle stopping condition, and means operable during such interval for restoring said means to normal condition.

11. A vehicle controlling apparatus including a magnetic rail of the track having a non-magnetic section at a controlling station, vehicle carried means including a device having a magnetic relation with said magnetic rail and affected when passing the non-magnetic section, said means normally maintaining a running condition and being operable when said device is affected when passing the non-magnetic section to produce, after an interval, a vehicle stopping condition, and means operable during such interval and controlling said means for obtaining speed control conditions or restoring said running condition selectively.

12. A vehicle controlling apparatus including a magnetic rail on the track having a non-magnetic section at a controlling station, a vehicle equipment having responsive means movable along said rail, said means having a magnetic relation with the magnetic rail for keeping the equipment in running condition and operable for producing a vehicle stopping condition when said means passes the non-magnetic section, and means assembled with said non-magnetic section to which the aforesaid means is responsive for producing speed control and clear conditions in succession, to restore running conditions in said equipment accordingly.

13. A vehicle controlling apparatus including a magnetic rail on the track having a non-magnetic section at a controlling station, a vehicle equipment having responsive means movable along said rail, said means having a magnetic relation with the magnetic rail for keeping the equipment in running condition and operable to establish a vehicle retarding condition each time said means passes said non-magnetic section, and a coil associated with said non-magnetic section, said means being responsive to the condition of said coil after said operation has been started for eliminating the vehicle retarding condition.

14. A vehicle controlling apparatus including a magnetic rail on the track having a non-magnetic section at a controlling station, a vehicle equipment having responsive means movable along the rail, said means having a magnetic relation with the magnetic rail for keeping the equipment in running condition and operable for producing vehicle stopping conditions when said means passes the non-magnetic section, and coils associated with said non-magnetic section, the aforesaid means being responsive to the controlled conditions of said coils for obtaining speed control and clear running conditions of said equipment in succession.

15. In a vehicle controlling apparatus, a magnetic rail having a non-magnetic section, and vehicle controlling devices associated with said non-magnetic section, for producing different controlling conditions in succession.

16. In a vehicle controlling apparatus, a non-magnetic vehicle controlling section of rail, an electrical vehicle controlling coil under said section, and a core for the coil having an intermediate yoke portion on which the coil is disposed and arms extending in opposite directions from the ends of said portion around and over the base flanges of said section with the terminals of the arms close to the tread of said section.

17. In a vehicle controlling apparatus, a vehicle controlling coil, and a core for the coil having an intermediate yoke portion on which the coil is disposed and oppositely extending arms at the ends of said portion, said arms being bent to extend around and over the base flanges of a non-magnetic section of rail, and the terminals of said arms being adapted to fit close to the thread of the rail.

18. A vehicle controlling apparatus including a normally inactive member released by control from the track when the vehicle passes a controlling station of the track and movable when released to produce a vehicle retarding condition, means for retarding the movement of said member, and means operable at such controlling station during such retarded movement of said member for eliminating such condition and restoring said member.

19. A vehicle controlling apparatus including a normally inactive member movable when released to produce a vehicle retarding condition, means for normally holding such member against movement and operable by control from the track to release said member when passing a controlling station of the track, means for retarding the movement of said member, and means operable at the controlling station after said member is released for producing other vehicle controlling conditions.

20. A vehicle controlling apparatus including a normally inactive member released by control from the track for movement when the vehicle passes a controlling station of the track and operable when released for producing vehicle stopping conditions, means for retarding the movement of said member, and means operable at the controlling station during such movement of said member for obtaining speed control and clear conditions and restoring said member.

21. A vehicle controlling apparatus including a normally inactive member movable when released to produce vehicle stopping conditions, means for holding said member against movement and operable by control from the track when passing a controlling station of the track to release said member, means for retarding the movement of said member, and means operable at the controlling station during such movement of the member for eliminating such conditions and producing speed control and clear conditions selectively.

22. A vehicle controlling apparatus including a normally inactive releasable member movable when released for producing vehicle retarding conditions, means operable by control from the track for releasing said member when passing a controlling station member of a track, means for retarding the movement of said member to require a predetermined distance of travel of the vehicle before such conditions are obtained, and means operable at the controlling station during such distance of travel for eliminating such conditions.

23. A vehicle controlling apparatus including a normally inactive member movable when released to produce vehicle stopping conditions, means for holding said member and operable by control from the track for releasing said member when passing a controlling station of the track, means operable according to the movement of the vehicle for retarding the movement of said member to require a predetermined distance of travel before such conditions are produced, and means operable at the controlling station during such distance of travel of the vehicle for restoring said member and producing either speed control or clear conditions.

24. A vehicle controlling apparatus including means operable for stopping the vehicle, a member movable when released for bringing said stopping means into operation, means for normally holding said member and operable by control from the track for releasing said member when passing a controlling station of the track, means for retarding the movement of said member to require a certain distance of travel of the vehicle before the stopping means is brought into operation, and means operable at the controlling station when said member has been released for restoring said member and preventing the stopping means from being operated.

25. A vehicle controlling apparatus including means operable for stopping the vehicle, a member movable when released for bringing said stopping means into operation, means for holding said member and operable by control from the track for releasing said member when passing a controlling station of the track, means for retarding the movement of said member to require a certain distance of travel of the vehicle before the stopping means is brought into operation, a speed governor, and selectively operable means operable at the controlling station when said member is released for either placing the control of the stopping means under the governor or restoring said member and clear conditions.

26. A vehicle controlling apparatus including means operable for stopping the vehicle, a member movable to bring said means into operation, means for holding said member and releasing same when passing a controlling station of the track, means for retarding the movement of said member to require a certain movement of the vehicle before the stopping means is brought into operation, a progressively operable device including selectively controlled means for advancing it when said member has been released at the controlling station of the track, a speed governor, means for placing the stopping means under the control of the governor, when said device is advanced to one position, and retaining such governor control of the stopping means until the subsequent response of said holding means in passing the next controlling station of the track, and means operable when said device is advanced to another position for eliminating such governor control of the stopping means and restoring clear running conditions.

27. A vehicle controlling apparatus including means operable for stopping the vehicle, a member movable for bringing said stopping means into operation, responsive means, a track equipment at each controlling station to which said responsive means is responsive when the vehicle passes a controlling station, means for holding said member and releasing same whenever such response of the responsive means is made, means for retarding the movement of said member to require a certain distance of travel of the vehicle before the stopping means is brought into operation, a speed governor, a progressively operable device controlled by said responsive means to be advanced to different positions, the track equipment including means controllable for the response of said responsive means to advance said device, means operable when said device is advanced to one position for bringing the stopping means under the control of the governor and for maintaining such control until the responsive means responds to the track equipment of the next controlling station and means operable when said device has been advanced to another position for eliminating such control of the stopping means by the governor and to restore normal running conditions before the stopping means is brought into operation.

28. In a vehicle controlling apparatus, a releasable member movable by itself when released for obtaining vehicle retarding conditions, means controlled from the track operable for releasing said member whenever passing a controlling station, means operable according to the movement of the vehicle for retarding the movement of said member, and means operable at such control station during such retarded movement of said member for eliminating such conditions.

29. In a vehicle controlling apparatus, a releasable member movable by itself when released for obtaining vehicle retarding conditions, means controlled from the track operable for releasing said member whenever passing a controlling station, gearing operated by the movement of the vehicle for retarding the movement of said member, and means operable at such control station during such retarded movement of said member for eliminating such conditions and restoring said member.

30. In a vehicle controlling apparatus, a member operable step by step for producing different controlling conditions, means for advancing said member step by step, and a detent magnet for holding said member in its advanced positions by the magnetic attraction of said member to said magnet, and controllable for releasing said member to return to normal position.

31. In a vehicle controlling apparatus, a member operable step by step to produce different controlling conditions, means for advancing said member step by step, and a detent magnet, said member having armature portions movable adjacent to said magnet in succession for holding said member in its advanced positions.

32. In a vehicle controlling apparatus, a member movable step by step to produce different controlling conditions, means for advancing said member step by step, a detent electromagnet, said member having armature portions movable in succession adjacent to said electromagnet to retain said magnet in its advanced positions, and means for opening the circuit of said electromagnet to release said member for return to normal position.

33. A vehicle controlling apparatus including a magnetic rail on the track having a non-magnetic section at a controlling station, a magnetically operable track device associated with said non-magnetic section, and a vehicle equipment including a device having a magnetic relation with the magnetic rail to be disturbed each time said device passes the non-magnetic section, means set into operation whenever said magnetic relation of the second named device is disturbed in passing the non-magnetic section to bring about the retarding of the vehicle, and means on the vehicle for eliminating the retarding of the vehicle including a magnetically responsive device movable into cooperation with said track device after the first-named means has been set into operation.

34. A vehicle controlling apparatus including a magnetic rail on the track having a non-magnetic section at the controlling station, an electrical track coil associated with said non-magnetic section and controlled for different conditions, and a vehicle equipment including a device having a magnetic relation with the magnetic rail which is disturbed each time when passing the non-magnetic section, means set into operation whenever such magnetic relation of said device with the rail is disturbed in passing the non-magnetic section for bringing about the retarding of the vehicle, and means on the vehicle for eliminating the retarding of the vehicle including a magnetically responsive device cooperable with said coil after the first named means has been set into operation.

35. Vehicle controlling apparatus including the vehicle track having a non-magnetic section, magnetic means having a magnetic relation with said track and said relation being broken when passing the non-magnetic section for obtaining a predetermined condition, run-down means released when said magnetic relation is broken for obtaining a predetermined controlling condition, and means operable when passing the non-magnetic section for controlling said run-down means.

36. Vehicle controlling apparatus including a translating device having a member movable in proportion to the movement of the vehicle when passing controlling stations for obtaining a vehicle stopping condition after the vehicle has moved a predetermined distance, said member being normally non-movable when travelling between controlling stations, and means for restoring said member during such distance of movement of the vehicle while passing a controlling station.

37. Vehicle controlling apparatus including a translating device having a member movable when passing controlling stations for obtaining a vehicle stopping condition, said member being normally non-movable when travelling between controlling stations, means for delaying such condition, by retarding the movement of said member, until the vehicle has travelled a predetermined distance, and means operable during such travel of the vehicle in such distance to avoid said condition.

38. Vehicle controlling apparatus including a translating device having a member movable when passing controlling stations for obtaining a vehicle stopping condition, said member being normally non-movable when travelling between controlling stations, means for retarding the movement of said member to delay such condition until the vehicle has travelled a predetermined distance, and means operable during the travel of the vehicle in such distance for avoiding such condition and restoring said member.

39. Vehicle controlling apparatus including a normally energized electrical translating device, means for deenergizing said device when passing controlling stations, a member normally held by said device when travelling between control stations and movable when released for obtaining a vehicle stopping condition, and means operable when passing a controlling station for restoring said member and reenergizing said device to avoid such condition.

40. Vehicle controlling apparatus including controlling stations at desired points of the vehicle track each including control elements, normally inactive vehicle carried means operable by a run-down motion at a speed according to the vehicle speed to obtain a predetermined vehicle condition when the vehicle has travelled a predetermined distance, and rendered active by a control element when passing a controlling station, and means controlled by another element at the controlling station during such distance of movement of the vehicle, when the firstnamed means is active, to avoid such condition.

41. Vehicle controlling apparatus including controlling stations as desired points of the track each including control elements, vehicle carried means operable by a run-down motion at a speed corresponding to the vehicle speed to obtain a predetermined vehicle condition when the vehicle has travelled a predetermined distance, means for restraining the operation of said means between controlling stations and releasing same for operation, when passing a controlling station, under the control of one of the control elements, and means controlled by another control element at the controlling station during such distance of movement of the vehicle, when the firstnamed means has started into operation, to avoid such condition.

42. Vehicle controlling apparatus including controlling stations at desired points of the track each including control elements, normally inactive vehicle carried means operable by a run-down motion at a speed according to the vehicle speed to obtain a predetermined vehicle condition when the vehicle has travelled a predetermined distance, and rendered active by a control element when passing a controlling station, and means controlled by the other control elements at the controlling station during such distance of movement of which the vehicle, when said firstnamed means is rendered active, to avoid such conditions and to selectively establish other vehicle conditions.

43. Vehicle controlling apparatus including controlling stations at desired points of the vehicle track each including control elements, vehicle carried means operable by a run-down motion at a speed according to the vehicle speed to obtain a predetermined vehicle condition when the vehicle has travelled a predetermined distance, means for restraining the operation of said means and controlled by a control element when passing a controlling station for releasing the firstnamed means for operation, and means controlled by the other control elements at the controlling station during such distance of movement of the vehicle, when the firstnamed means is in operation, to avoid such condition and to selectively establish other vehicle conditions.

44. Vehicle controlling apparatus including controlling stations at desired points of the vehicle track each including control elements, normally inactive vehicle controlling means operable by a run-down motion at a speed according to the vehicle to produce a predetermined vehicle condition when the vehicle has travelled a predetermined distance, and rendered active by a control element when passing a controlling station, and means controlled by the other control elements at the controlling station to avoid such condition and operable one or more times to establish different vehicle conditions accordingly.

45. Vehicle controlling apparatus including controlling stations at desired points of the vehicle track each including control elements, vehicle controlling means operable by a run-down motion at a speed according to the vehicle speed to obtain a predetermined vehicle condition when the vehicle has travelled a predetermined distance, means for restraining the operation of said means and controlled by a control element when passing a controlling station to release the firstnamed means for operation, and means controlled by the other control elements during such distance of movement of the vehicle at the controlling station to avoid such condition and operable one or more times to obtain other vehicle conditions in succession.

46. Vehicle controlling apparatus including a run-down device operable at a speed according to the speed of the vehicle for obtaining an ultimate condition when the vehicle has travelled a predetermined distance, means for normally restraining the operation of said device and releasing said device when passing a controlling station of the track, and means for resetting said device during such distance of movement of the vehicle when passing the station to avoid such condition.

47. Vehicle controlling apparatus including a run-down device on the vehicle for obtaining an ultimate condition, means for normally restraining the operation of said device and releasing said device when passing a controlling station of the track, and means operable, when passing a controlling station, for obtaining other conditions selectively and resetting said device.

48. Vehicle controlling apparatus comprising a non-magnetic section in the vehicle track at each controlling station, vehicle carried responsive means having a magnetic relation with the track for obtaining an interruption in said magnetic relation whenever said means passes a non-magnetic section, means associated with the track at each controlling station to differently influence said responsive means during such interruption of the magnetic relation, and vehicle controlling means controlled by said responsive means and operable for obtaining one vehicle condition when said interruption in magnetic relation occurs without the influence of the responsive means by the secondnamed means, and for obtaining other vehicle conditions selectively when said responsive means is influenced differently by the secondnamed means during said interruption in magnetic relation.

49. Vehicle controlling apparatus comprising a non-magnetic section in the vehicle track at each controlling station, vehicle carried responsive means having a magnetic relation with the track for obtaining an interruption in said magnetic relation whenever said means passes a non-magnetic section, means on the track at each controlling station for influencing the responsive means for different conditions during such interruption in magnetic relation, and controlling means on the vehicle controlled by said responsive means for obtaining one vehicle condition when said interruption in magnetic relation occurs without the responsive means being influenced by the secondnamed means, and for obtaining other conditions selectively when the responsive means is influenced for different conditions by the secondnamed means during said interruption in said magnetic relation.

50. Vehicle controlling apparatus comprising a non-magnetic section in the vehicle track at each controlling station, vehicle carried track responsive means magnetically related with the track for obtaining an interruption in the magnetic relation whenever said means passes a non-magnetic section, another vehicle carried responsive means, means on the track at each controlling station to influence the secondnamed responsive means during the aforesaid interruption in magnetic relation, and vehicle controlling means controlled by both responsive means and operable for obtaining one vehicle condition when said interruption in magnetic relation occurs without the secondnamed responsive means being influenced by said means on the track, and for obtaining another vehicle condition when the secondnamed responsive means is influenced by said means on the track during said interruption in magnetic relation.

51. Vehicle controlling apparatus comprising a non-magnetic section in the vehicle track at each controlling station, vehicle carried track responsive means magnetically related with the track for obtaining an interruption in said magnetic relation whenever said means passes a non-magnetic section, another responsive means carried by the vehicle, means on the track at each controlling station for influencing the secondnamed responsive means for different conditions, and vehicle controlling means controlled by both responsive means and operable for obtaining one condition of vehicle control when said interruption in magnetic relation occurs without the secondnamed responsive means being influenced by said means on the track, and for obtaining other conditions of vehicle control selectively when the secondnamed responsive means is controlled for different conditions by said means on the track during said interruption in magnetic relation.

52. Vehicle controlling apparatus comprising a non-magnetic section in the vehicle track at each controlling station, vehicle-carried track-responsive means magnetically related with the track for obtaining an interruption in said magnetic relation whenever said means passes a non-magnetic section, vehicle-carried inductive receiving means, inductive means on the track at each controlling station to influence said receiving means, and vehicle controlling means controlled by said responsive and receiving means for obtaining one vehicle condition when said interruption of magnetic relation occurs without said receiving means being influenced by said means on the track, and for obtaining another vehicle condition when said receiving means is influenced by said means on the track during such interruption in magnetic relation.

53. Vehicle controlling apparatus comprising a non-magnetic section in the vehicle track at each controlling station, vehicle-carried track-responsive means magnetically related with the track for obtaining an interruption in said magnetic relation whenever said means passes a non-magnetic section, vehicle-carried inductive receiving means, means on the track at each controlling station to influence said receiving means for different conditions, and vehicle controlling means controlled by said responsive and receiving means and operable for obtaining one condition when said interruption of magnetic relation occurs without said receiving means being influenced by said means on the track, and for obtaining other vehicle conditions selectively when said receiving means is influenced for different conditions by said means on the track during said interruption of magnetic relation.

In testimony whereof I hereunto affix my signature.

ALFRED L. RUTHVEN.